Figure 1:
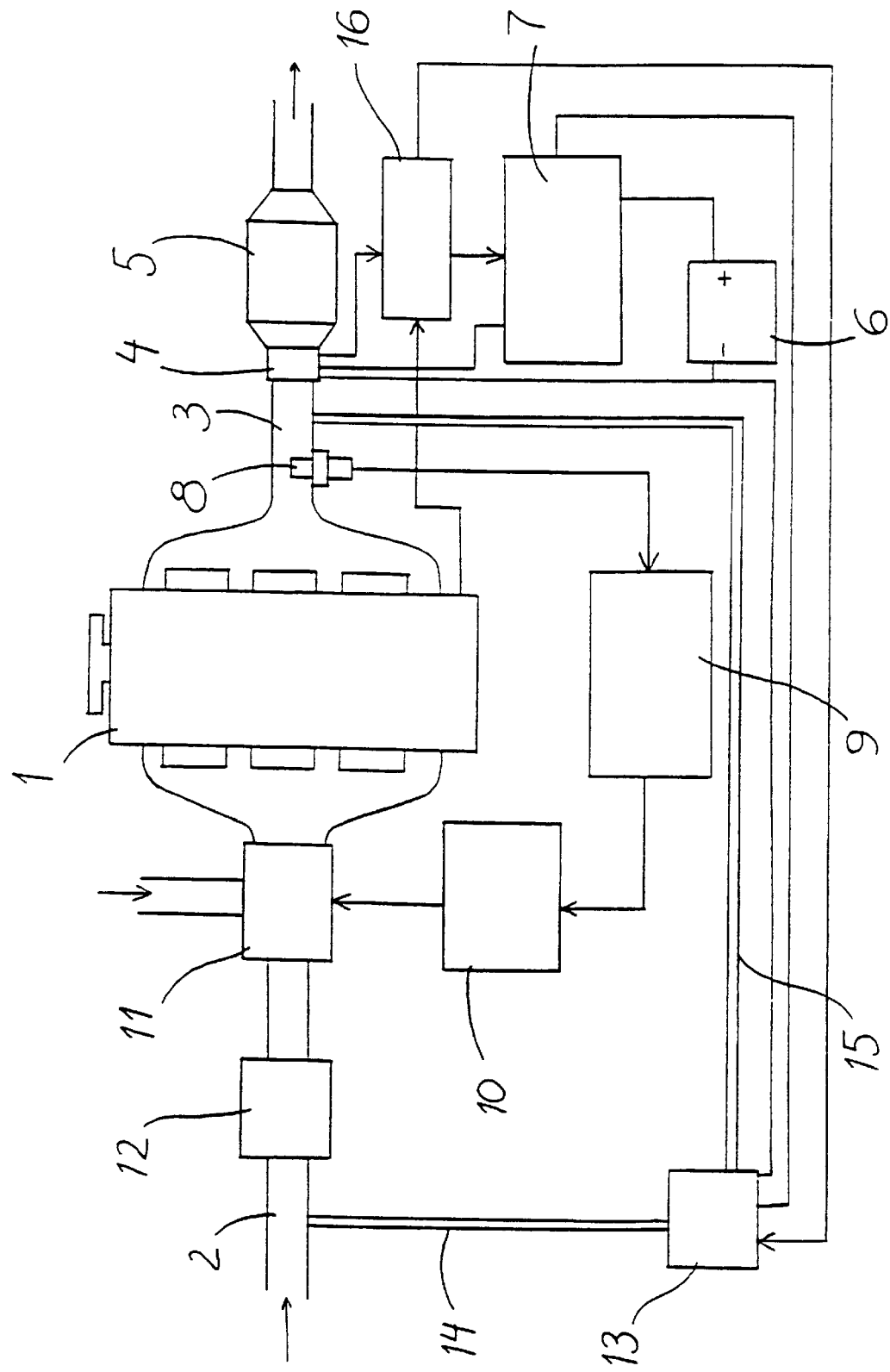

United States Patent
Gottberg

[19]
[11] Patent Number: 5,809,773
[45] Date of Patent: Sep. 22, 1998

[54] METHOD AND A DEVICE FOR CATALYST EMISSION CONTROL

[75] Inventor: Ingemar Gottberg, Västra Frölunda, Sweden

[73] Assignee: AB Volvo, Gothenburg, Sweden

[21] Appl. No.: 107,709

[22] PCT Filed: Feb. 20, 1992

[86] PCT No.: PCT/SE92/00101

§ 371 Date: Aug. 19, 1993

§ 102(e) Date: Aug. 19, 1993

[87] PCT Pub. No.: WO92/14912

PCT Pub. Date: Sep. 3, 1992

[30] Foreign Application Priority Data

Feb. 22, 1991 [SE] Sweden .................................. 9100541

[51] Int. Cl.⁶ ........................................................ F01N 3/20
[52] U.S. Cl. ................................ 60/274; 60/284; 60/289; 60/300
[58] Field of Search ............................. 60/284, 274, 300, 60/289

[56] References Cited

U.S. PATENT DOCUMENTS

| | | |
|---|---|---|
| 3,503,716 | 3/1970 | Berger ........................................ 60/284 |
| 4,125,997 | 11/1978 | Abthoff et al. ............................. 60/289 |
| 4,976,929 | 12/1990 | Cornelison et al. ..................... 422/174 |
| 5,155,995 | 10/1992 | Kinnear ..................................... 60/284 |
| 5,319,929 | 6/1994 | Cornelison ................................ 60/300 |

FOREIGN PATENT DOCUMENTS

| | | |
|---|---|---|
| 0412521 | 8/1990 | European Pat. Off. . |
| 3506235 | 9/1985 | Germany . |
| 63-18122 | 1/1988 | Japan . |
| 89/10470 | 11/1989 | WIPO . |

*Primary Examiner*—Douglas Hart
*Attorney, Agent, or Firm*—Burns, Doane, Swecker & Mathis, LLP

[57] ABSTRACT

A method and a device are disclosed for catalyst emission control including an electrically heated startup catalyst which is positioned adjacent a main catalyst in the exhaust pipe associated with the engine. Also provided are a source of current, a switch, a control unit, a lambda sensor, and an electrically operated air pump including and air channel inserted between the lambda sensor and the startup catalyst. In connection with startup of the engine the startup catalyst and/or the air pump are activated by means of the control unit. The invention provides improved purification of the exhaust gases emitted by the engine.

16 Claims, 1 Drawing Sheet

METHOD AND A DEVICE FOR CATALYST EMISSION CONTROL

The subject invention concerns a method for catalyst emission control in vehicles comprising an engine having an inlet pipe and an exhaust pipe and wherein an electrically heated start-up catalyst and a main catalyst are placed adjacent one another in the exhaust pipe. The invention likewise concerns a device for performing the method.

New and stricter legislation, particularly in the USA, with respect to future limitations on air-pollutant emission levels makes it increasingly desirable to achieve more efficient emission control in motor vehicles. Today, catalyst emission control devices are those most commonly used. However, they are not capable of operating at their maximum purification efficiency during the vehicle cold-start period. Consequently, a large proportion of the air-polluting exhaust gases emitted from the present catalyst-equipped motor vehicles are generated during the heating-up period of the catalyst, a period which lasts until the catalyst reaches its operational temperature (approx. 250° to 400° C.). In the case of cold starts, this period may last several minutes and therefore creates a problem.

Catalysts of traditional type may be supplemented with an additional electrically heated start-up catalyst. A device of this kind is previously known from Patent Publication WO 89/10470. By heating the start-up catalyst electrically during the engine start-up it becomes possible to shorten the heating-up period of the catalyst package as a whole.

The subject invention provides improved purification of the exhaust gases in motor vehicles whereby the emission of pollutants may be controlled to within the stipulated levels. This is achieved by means of a method of the kind defined initially which is characterized in that in connection with the engine start-up a flow of air is supplied into the exhaust pipe through an air channel debauching upstream of the start-up catalyst, and in that this flow is interrupted at the latest when the main catalyst reaches its light-off temperature.

The invention will be described in the following with reference to one embodiment thereof and to the annexed drawing FIG. 1, showing an emission control system in accordance with the invention.

The system illustrated in the drawing figure is intended to purify the exhaust gases from a combustion engine 1, which could be either of the traditional gasoline-fuelled type, or be intended for alternative fuels such as LPG, natural gas or alcohol fuels. The engine is equipped with an inlet pipe 2 and an exhaust pipe 3. The exhaust gases from the engine 1 are conducted through a catalyst package comprising an electrically heated start-up catalyst 4 and a main catalyst 5 which is connected to the start-up catalyst. The main catalyst 5 is of standard type, consisting e.g. of a round ceramic substrate 4.66"×6", 400 cpsi (cpsi=cells per square inch), with a PM loading of 50 $g/ft^3$ (PM=precious metal) and a relationship Pt/Rh of 5:1. The start-up catalyst 4 is mounted upstream of the main catalyst 5 at a distance therefrom amounting to 0.1–5 times, and preferably 1.5–2.0 times, the length of the support structure of the start-up catalyst, in order to achieve favourable flow and temperature conditions.

The start-up catalyst 4 comprises a tubular metal catalyst-coated housing (e.g. having a diameter of 90 cm, a length L of 28 cm, 200 cpsi, with a PM loading of 60 $g/ft^3$ and a relationship Rt/Rh of 5:1) of a particularly heat-resistant nature. The catalyst support inside the metal housing acts as a resistive load which may be connected to a source of current for heating.

In addition, the start-up catalyst is connected to a battery 6 which as a rule is the normal vehicle starter battery. In some cases, the normal vehicle starter battery capacity is insufficient for the current needs of the start-up catalyst 4, in which case a separate electric energy supply system may be required.

To connect the start-up catalyst 4 to the source of current, an electronic switch 7 is inserted between the catalyst 4 and the battery 6. The switch preferably is of semi-conductive type to minimize losses and ensure reliable connection of current to the start-up catalyst 4 without risks for the generation of electro-magnetic pulses, a phenomenon that otherwise frequently occurs in vehicles. The switch 7 could also be of a relay-type.

Upstream from the start-up catalyst 4 a sensor, known as a lambda sensor 8, is positioned for the purpose of detecting the presence of oxygen in the exhaust gases. The lambda sensor 8 is connected to an electronic unit 9 for adaptation of the signals from the lambda sensor 8 to a correction unit 10. The correction unit 10 is designed to determine and emit a signal relating to the air/fuel mixture to the injection unit 11 of the engine 1. The injection unit 11 preferably is of a type commonly used in this position as is also an air quantity meter 12 incorporated in the system.

The system also comprises an electrically controlled air pump 13 to which air is supplied through a first air channel 14, the latter being connected to the inlet pipe 2 of the engine 1 upstream from the air quantity meter 12. The air pump 13 may be operated to supply air into the system upstream from the catalyst package 4, 5 through a second air channel 15 which is connected to the exhaust pipe 3 at a point between the lambda sensor 8 and the start-up catalyst 4. The air pump 13 comprises a check valve (not shown) serving to protect the air pump 13 from any hot back-flow exhaust gases that may flow towards the air pump 13. To energize the air pump 13, the latter is connected to an output terminal of the electronic switch 7, which terminal is independent of the operation of the start-up catalyst 4.

The system also comprises a computer-based control unit 16 which is connected to and designed to emit control signals to the switch 7 and the air pump 13. A temperature sensor (not shown) is likewise connected to the control unit 16, said sensor being positioned adjacent the start-up catalyst 4 and arranged to supply a signal representative of the temperature of the start-up catalyst 4. The temperature sensor may be a sheath-type resistance thermometer which is integrated with the start-up catalyst 4 during the manufacture thereof. In this way, the temperature of the start-up catalyst 4 may be monitored accurately.

The control unit 16 serves to regulate the operation of the start-up catalyst 4 on a time basis and/or with regard to temperature, to monitor the start-up catalyst 4 including the temperature sensor, to monitor current supply to the start-up catalyst 4 from the battery 6 and, as the case may be, from the vehicle electricity generator (not shown) and also to control the air pump 13 operation with regard to amounts of flow. Current supply monitoring is effected by voltage measurement, not to be described in any detail here, related to the starter battery circuit. Monitoring of the start-up catalyst 4 is effected by measuring its resistance, which will not be described here in any detail.

In the following, the function of the emission control system of the invention will be described. When the engine 1 is started, the above-mentioned current supply monitoring activity results in a check being made as to the capacity of the battery 6 to supply sufficient energy to the start-up catalyst 4. If the energy contents of the battery 6 are found to be sufficient and if the monitoring conditions of the start-up catalyst are normal, the process for heating the start-up catalyst 4 will be initiated. At the same time, the additional air supply via the air pump 13 will start. The heating and the air supply continue for a predetermined period or until a predetermined temperature is reached in the start-up catalyst 4. These conditions correspond to the obtainment of the light-off temperature in the catalyst package 4, 5 as a result of the electrical heating and exothermal reactions. At this point, the air injection and the heating are cut off.

It should be pointed out that normally, there is no supply of air after obtainment of the light-off temperature of the catalyst package 4, 5, since such supply would have an unfavourable effect on the NOx-emissions, and also that the heating of the start-up catalyst 4 may be effected irrespectively of the air supply via the air pump 13.

In accordance with the embodiment described, the switch 7 is activated in such a manner that the process of heating the start-up catalyst 4 is initiated directly following ignition of the engine 1 (after the so called engine "cranking" process). It may also be desirable to preheat the start-up catalyst 4 prior to engine cranking, alternatively to heat it before as well as after the cranking process. However, it may be disadvantageous to activate the start-up catalyst 4 while the vehicle starting motor is operating, since the latter may need the entire capacity of the battery 6. The heating increases the temperature of the exhaust gases flowing through the start-up catalyst 4 when these exhausts are conducted into the main catalyst 5, with the result that the complete catalyst package 4, 5 will reach its light-off temperature more quickly, i.e. the temperature at which the catalyst package 4, 5 is sufficiently heated to operate with an acceptable purification efficiency.

The flow of air from an activated air pump 13 is intended to contribute to a comparatively lean exhaust gas mixture being directed to the catalyst package 4, 5 during the heating-up period of the latter, i.e. the exhaust gas mixture inside the exhaust pipe 3 is to have a small excess of oxygen. Since it takes about 30 seconds for the lambda sensor 8 to reach its full efficiency level, thus allowing the engine 1 to run at the stoichiometric ratio, the lambda sensor system cannot be used to regulate the air supply to the catalysts 4, 5 during this period. Air supply downstream from the lambda sensor 8 may, however, result in a controlled excess of oxygen being supplied to the exhaust gases flowing to the start-up catalyst 4 during the start-up, the heating-up and the early driving phase of the engine 1. In this manner the function of the lambda sensor 8 will not be disturbed by the flow of air supplied from the air pump 13, since the air injection takes place downstream from the lambda sensor 8.

It has been found that an excess of oxygen in the order of 1% (as compared to the stoichiometric amount of 0.63% oxygen) gives a decrease of the catalyst light-off temperature by 20°–30° C. (with respect to control of HC and CO) whereas an excess of oxygen in the order of 2% gives a corresponding decrease of the light-off temperature by 30°–50° C. Also the light-off temperature with respect to the control of the NOx emissions may be improved by an excess of oxygen in the exhaust gas mixture.

When the heating of the start-up catalyst 4 is cut off, there is a sudden temperature drop with resulting cooling of the start-up catalyst 4, which in turns leads to a reduction of the degree of purification obtained. However, together with the existing cool and rich exhaust gas composition, such cooling has the effect that the main catalyst 5 will react in such a manner that a transient temperature increase will take place in its catalytic material before it is cooled off. The quick decrease in the temperature of the exhaust gas mixture, together with the fact that a cool and rich exhaust mixture is present (as noted above), makes the main catalyst 5 react with a sudden increase in the temperature of the catalytic material of the main catalyst. This phenomenon is sometimes referred to as "wrong way behaviour" and is disclosed in 'Transients of Monolithic Catalytic Converters: Response to Step Changes in Feedstream Temperature as Related to Controlling Automobile Emissions', Se H. Oh & James C. Cavendish, General Motors Research Laboratories, Warren, Mich. 48090, USA, Ind. Eng. Chem. Prod. Res. Dev., Vol. 21, No. 1, 1982 which is incorporated herein by reference. This effect may be made use of in the following manner. The emission control system in accordance with the invention may be arranged in such a manner that via the control unit 16 and the switch 7 a pulsating current is supplied to the start-up catalyst 4, said current pulses causing rapid temperature increases followed by temperature reductions in the start-up catalyst 4. In combination with the pre-requisite that on the one hand the current supply capacity is sufficient (i.e. the power supply to the start-up catalyst 4 is sufficiently high) and on the other that the geometrical position of the start-up catalyst 4 is at a distance from the main catalyst 5 of preferably 1.5 to 2.0 times the length of the supporting structure of the start-up catalyst 4, the result will be "wrong way behaviour" of the catalyst package 4, 5, which significantly contributes to a reduction of the time required before the catalyst package 4, 5 reaches its light-off temperature.

It should be pointed out, that parameters such as current intensity prior to supply to the start-up catalyst 4 and the geometry of the location of the start-up catalyst 4 in relation to that of the main catalyst 5, may be adjusted in response to the needs of the specific applications of the system.

It should furthermore be pointed out that a system in accordance with the invention may be controlled by heating of the start-up catalyst 4 without air injection from the air pump 13 and vice versa. The total effect of the emission control achieved by the catalyst package 4, 5 in the case of heating combined with air injection does, however, surpass the level of control achieved from each one of these functions separately.

Further improved purification efficiency is achieved when the control unit 16 is arranged to actuate the air pump 13 in such a manner that the air supply is optimized with regard to the flow of exhaust gases instead of maintaining the air supply at a constant level as indicated above. In this case, the air pump 13 must be capable of allowing a variable flow of air into the exhaust pipe 3. The amount of the excess of oxygen in the exhausts may then be varied on a time basis upon activation of the air pump 13. For instance, the flow may be dimensioned in such a manner that the excess of oxygen in the exhaust gases is decreased step by step in order to optimize the purification efficiency of the catalyst package 4, 5.

I claim:

1. A method for catalyst emission control in vehicles comprising an engine having an inlet pipe and an exhaust pipe and wherein an electrically heated start-up catalyst and a main catalyst are placed adjacent one another in the exhaust pipe, the method comprising:

activating the start-up catalyst in connection with the start-up of the engine with a pulsating current of such a nature as to produce alternate increases and reductions of the temperature of the exhaust gases;

transmitting the temperature changes to the main catalyst through the exhaust gas mixture such that said main catalyst reacts by increasing its temperature.

2. A method as claimed in claim 1, further comprising supplying a flow of air to the exhaust pipe via an air channel debouching into said exhaust pipe upstream from the start-up catalyst.

3. A method as claimed in claim 2, further comprising regulating the flow of air supplied to the exhaust pipe to effect a successive reduction of said flow, beginning at a predetermined starting level.

4. A method as claimed in claim 3, wherein the flow of air supplied to the exhaust pipe is regulated to produce contents of oxygen in said exhaust gases of between 5 to 0% above the stoichiometric oxygen level.

5. A method as claimed in claim 4, wherein the oxygen contents of the exhaust gases are reduced stepwise.

6. A device for catalyst emission control comprising:

an engine having an inlet pipe and an exhaust pipe;

an electrically heated start-up catalyst and a main catalyst placed adjacent one another in the exhaust pipe;

a switch; and a control unit, said control unit being arranged to emit control signals to said switch to provide said start-up catalyst with a pulsating current.

7. A device as claimed in claim 6, wherein the start-up catalyst is positioned in said exhaust pipe upstream from the main catalyst at a distance therefrom amounting to 0.1 to 5.0 times the length of a support structure of the start-up catalyst.

8. A device for catalyst emission control comprising;

an engine having an inlet pipe and an exhaust pipe;

an electrically heated start-up catalyst activated with a pulsating current and a main catalyst placed adjacent one another in the exhaust pipe;

a source of air which is connected to the exhaust pipe through an air channel debauching into said exhaust pipe; and a control unit for regulating the flow of said source of air, said control unit being connected to said source of air and being arranged to regulate the flow of air from the source of air to the exhaust pipe.

9. A device as claimed in claim 8, wherein the control unit is arranged to regulate the flow so as to maintain an excess of oxygen in said exhaust gases that is constant compared with the stoichiometric ratio.

10. A device for catalyst emission control comprising;

an engine having an inlet pipe and an exhaust pipe;

an electrically heated start-up catalyst activated with a pulsating current and a main catalyst placed adjacent one another in the exhaust pipe;

a source of air which is connected to the exhaust pipe through an air channel debouching into said exhaust pipe, wherein the flow of said source of air may be regulated by a control unit which is connected to said source of air and which is arranged to regulate the flow of air from the source of air to the exhaust pipe to produce contents of oxygen in said exhaust gases of between 5 to 0% above the stoichiometric ratio.

11. A method as claimed in claim 1, further comprising supplying the start-up catalyst with a cool and rich exhaust gas mixture.

12. A method as claimed in claim 1, wherein each reduction of temperature in the start-up catalyst causes an increase in the temperature in the main catalyst.

13. A device as claimed in claim 8, wherein the start-up catalyst is positioned in said exhaust pipe upstream from the main catalyst at a distance of from 0.1 to 5.0 times the length of a support structure of the start-up catalyst.

14. A device as claimed in claim 8, wherein the start-up catalyst is positioned in said exhaust pipe upstream from the main catalyst at a distance of from 1.5 to 2.0 times the length of a support structure of the start-up catalyst.

15. A device as claimed in claim 10, wherein the start-up catalyst is positioned in said exhaust pipe upstream from the main catalyst at a distance of from 0.1 to 5.0 times the length of a support structure of the start-up catalyst.

16. A device for catalyst emission control comprising:

an engine having an inlet pipe and an exhaust pipe;

an electrically heated start-up catalyst activated with a pulsating current and a main catalyst placed adjacent one another in the exhaust pipe; and said start-up catalyst being positioned in said exhaust pipe upstream from the main catalyst at a distance of from 0.1 to 5.0 times the length of a support structure of the start-up catalyst.

\* \* \* \* \*